United States Patent
Schneider

(10) Patent No.: US 6,367,430 B1
(45) Date of Patent: Apr. 9, 2002

(54) SCALLOPED LATTICE BAR NUCLEAR STEAM GENERATOR TUBE SUPPORTS

(75) Inventor: William G. Schneider, Branchton (CA)

(73) Assignee: Babcock & Wilcox Canada, Ltd., Cambridge (CA)

(*) Notice: Subject to any disclaimer, the term of this patent is extended or adjusted under 35 U.S.C. 154(b) by 0 days.

(21) Appl. No.: 09/531,625

(22) Filed: Mar. 21, 2000

(51) Int. Cl.[7] .................................................. F22B 37/24
(52) U.S. Cl. ...................................... 122/510; 376/462
(58) Field of Search ................................ 122/493, 510, 122/511; 110/325; 376/462

(56) References Cited

U.S. PATENT DOCUMENTS

| | | | | |
|---|---|---|---|---|
| 3,996,102 A | * | 12/1976 | Thome | 376/462 |
| 4,286,366 A | * | 9/1981 | Vinyard | 122/510 |
| 4,359,088 A | * | 11/1982 | Jabsen | 122/510 |
| 5,183,629 A | * | 2/1993 | Canat et al. | 376/462 |
| 5,213,155 A | * | 5/1993 | Hahn | 122/510 |

* cited by examiner

Primary Examiner—Gregory Wilson
(74) Attorney, Agent, or Firm—Eric Marich

(57) ABSTRACT

A lattice high bar for a nuclear steam generator tube support bar array has scalloped indentations along its length. The scalloped indentations are located at points on the high bar where water tubes will contact the high bar. The indentations extend from one edge of the high bar to about two-thirds of the distance across the bar. When the high bars are used in a lattice bar array, only the unscalloped portion of the high bar contacts an adjacent supported tube, thereby reducing the contact area and the likelihood of corrosion and cracking and also reducing the length over which inspection is impeded. Additionally, the flow path created by opposed but overlapping scallops at the 120° intersections at certain points along the high bars improves the flow sweeping over the surface of the supported tube.

10 Claims, 1 Drawing Sheet

SCALLOPED LATTICE BAR NUCLEAR STEAM GENERATOR TUBE SUPPORTS

FIELD AND BACKGROUND OF THE INVENTION

1. Field of the Invention

The present invention relates generally to the field of nuclear power generation and in particular to a new and useful lattice bar support for retaining and positioning water tubes within a nuclear steam generator.

2. Description of the Related Art

One known type of lattice support is manufactured by Babcock & Wilcox Canada Ltd. The lattice support has an array of bars arranged in a diamond grid pattern for supporting the multiplicity of water tubes in the steam generator. The bar array is supported by a peripheral heavy structural ring, which is connected to the outer shroud and shell of the steam generator. The bars transmit the support load to the ring, which conveys it in turn to the shroud and shell.

The bars in the array are arranged parallel to one of two directions and when bars of different direction cross over each other, they form angles at bar intersections of 60° and 120°.

The bars are of two types, high bars and low bars. Low bars comprise the majority of the bars in the array and are about 1 inch high. High bars about 3 inches in height are used about every 4 to 8 bars in the array and have slots in their edges to permit bars arranged in the other direction to cross at the same level within the peripheral ring. The slots are typically 1 inch deep for low bar intersections and 1 ½ inches deep for high bar intersections. The high bars are used to help position the low bars within the array and to transmit accumulated load to the peripheral ring.

The known high bars have flat sides which contact tubes positioned in each of the channels formed by two pairs of differently oriented bars. The contact area with the tubes is greater with high bars than low bars. The contact area is subject to greater risk of corrosion and rupture due to interactions between materials in nuclear steam generators. The larger the contact area, the greater the risk of corrosion and/or cracking of the water tubes, which will in turn lead to release of contaminated pressurized water from the tubes. Further, due to the greater contact area between tubes and high bars, eddy current inspection techniques for detecting cracks and tube damage are less reliable in these regions.

SUMMARY OF THE INVENTION

It is an object of the present invention to provide a lattice bar support which reduces corrosion and/or cracking of tubes in nuclear steam generators.

It is a further object of the invention to provide a lattice bar support which reduces the probable size of tube ruptures from corrosion due to contact with the support.

Accordingly, a lattice high bar is provided having scalloped indentations along its length. The scalloped indentations are located at points on the high bar where water tubes will contact the high bar. The indentations extend from one edge of the high bar to a point about two thirds of the way across the bar. When the high bars are used in a lattice bar array, only the unscalloped portion of the high bar contacts the adjacent supported tube, thereby reducing the contact area and the likelihood of corrosion and cracking.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
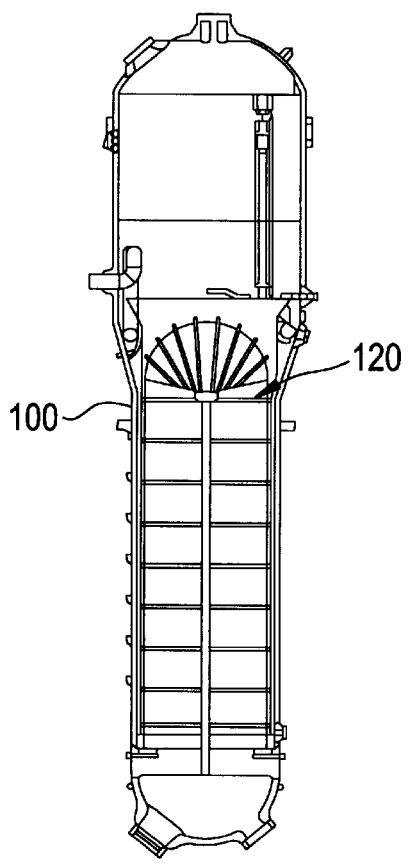
FIG. 1 is a sectional front elevational view of a nuclear steam generator where high bars of the invention are used.

Referring now to the drawings, in which like reference numerals are used to refer to the same or functionally similar elements, FIG. 1 shows a nuclear steam generator 100 having a series of lattice support bar arrays 120 at various points along its height for supporting a plurality of water tubes within the steam generator.

Figure 2:
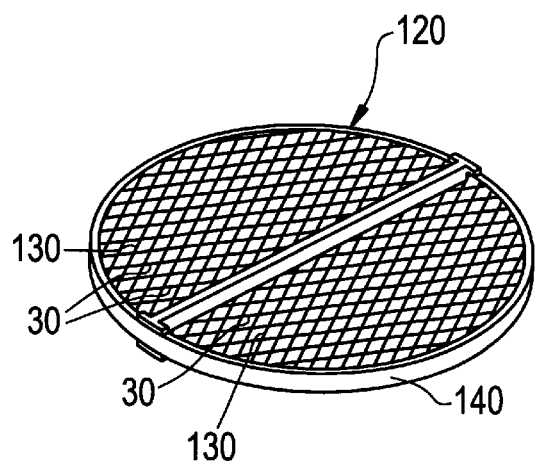
FIG. 2 is a perspective view of a lattice bar support array using high bars of the invention.

The lattice support bar arrays 120 have a peripheral ring 140 supporting a series of high and low bars 30, 130, respectively, as shown in FIG. 2. The high and low bars 30, 130 are arranged parallel to one of two directions, with intersection angles of 60° and 12° where bars 30, 130 oriented in different directions cross each other.

Figure 3:
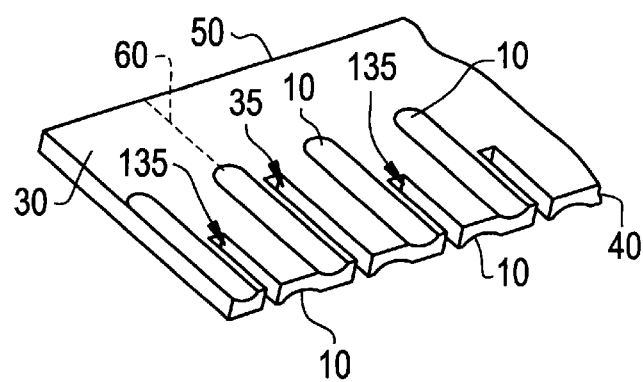
FIG. 3 is a perspective view of an end section of a high bar for the lattice bar support array of FIG. 2.

FIG. 3 displays one end of a high bar 30 of the invention. The high bar 30 has slotted edge 40 and unslotted edge 50. A series of spaced apart slots 35, 135 are formed extending from the slotted edge 40 toward the unslotted edge 50. The slots 35, 135 are provided at points where intersections will be made with bars 30, 130 oriented in the opposite direction in the bar array 120. The slots 35, 135 vary in length depending on which type of high or low bar 30, 130 that the high bar 30 will intersect with. The slots are typically about 1 inch deep for low bar 130 intersections and 1½ inches deep for high bar 30 intersections.

In the spaces between each slot 35, 135, a scalloped indentation 10 is formed on each side of the high bar 30. The indentations 10 of one side are longitudinally offset from the indentations 10 of the other side. The indentations are about 1¾ inches long and extend from the slotted edge 40.

The indentations 10 are formed extending from the same edge as the slots 35, 135. The scalloped indentations 10 have arcuate cross sections, and a maximum depth of not more than one-half the thickness of the high bar 30. The width of the indentations 10 is not more than the diameter of the tubes used in the steam generator 100, and thus will typically be about ⅝ to ⅞ inch wide. It is believed that the present invention will be most effective when these parameters are nearly equal to the half thickness and the tube diameter, respectively.

Figure 4:
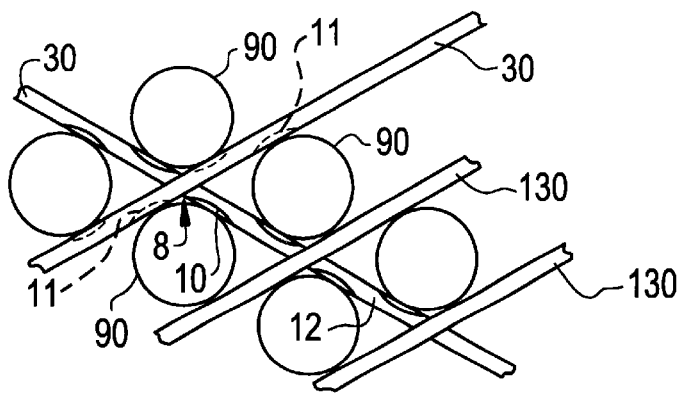
FIG. 4 is a top plan view of a section of the lattice bar support array of FIG. 2.

When the high bars 30 are used in the bar array 120, the scalloped indentations align with the tubes positioned between adjacent pairs of bars 30, 130. The scalloped indentations 10 do not contact the tubes 90, as shown in FIG. 4. The scalloped indentations 10 leave a tube contact area 60 on the high bar 30 which is similar to that of the low bar 130, or about 1¼ inches long.

FIG. 4 illustrates the use of high bars 30 having the scalloped indentations 10 in greater detail. High bars 30 intersect with each other and low bars 130 in a section of the bar array 120. Tubes 90 are positioned in the spaces formed between the bars 30, 130 and contact the bars 30, 130 for support.

One high bar 30 is oriented so that its indentations 11 are oriented opposite the indentations 10 of the other high bar 30. A small corner passage 8 is formed by the indentations 10, 11 at the 120° angle intersections between high bars 30. Since the indentations 10, 11 are longer than one-half the height of the high bars 30, they create a continuous passage in the 120° angle corner. The corner passage 8 allows improved sweeping of flow through the tube to bar space and reduced potential for deposit buildup in the 120° angle intersection corners.

The high bars 30 of the invention do not sacrifice structural strength, since a full thickness section 12 of the bar remains between each of the longitudinally offset indentations 10 on each side of the high bar 30, and the bar 30 is full thickness above the scalloped indentations 10.

The scalloped indentations 10 could be formed by machining with a round nose cutter, machining with a radiused cutting wheel, rolling with a special setup at the bar forming mill or such as by pressing, coining or forging prior to slotting.

The indentations 10 provide a reduced tube contact area 60 without substantially reducing structural strength. The reduced contact area 60 results in less likelihood of corrosion and cracking, and limits the area in which such tube damage would occur. The reduced area of likely damage also reduces the potential volume of contaminated steam or water that might be released in event of a tube failure due to corrosion and cracking. Additionally, the reduced contact length 60 reduces the length of tube for which eddy current inspection of the tube as impeded by direct contact with the bar.

While a specific embodiment of the invention has been shown and described in detail to illustrate the application of the principles of the invention, it will be understood that the invention may be embodied otherwise without departing from such principles.

I claim:

1. A lattice support high bar for a nuclear steam generator tube support bar array, the lattice support high bar comprising:

an elongated flat rectangular bar having slotted and unslotted edges, a pair of ends, and first and second sides;

a plurality of spaced apart slots extending from the slotted edge toward the unslotted edge of the elongated flat rectangular bar;

a first plurality of scalloped indentations on the first side extending from the slotted edge toward the unslotted edge, each indentation oriented adjacent to one of the plurality of slots; and a second plurality of scalloped indentations on the second side extending from the slotted edge toward the unslotted edge, each indentation oriented adjacent to one of the plurality of slots and longitudinally offset from the first plurality of scalloped indentations on the first side.

2. The lattice support high bar according to claim 1, wherein the bar is about 3 inches high.

3. The lattice support high bar according to claim 1, wherein a maximum depth of each scalloped indentation is not more than one half of a thickness of the elongated flat rectangular bar.

4. The lattice support high bar according to claim 1, wherein the scalloped indentations each have a length which is greater than one-half a height of the elongated flat rectangular bar.

5. The lattice support high bar according to claim 1, wherein the scalloped indentations have a length of about 1¾ inches.

6. A method of making a lattice support high bar for a nuclear steam generator tube support bar array, the steps of the method comprising:

providing an elongated flat rectangular bar having a pair of opposite ends, first and second opposite edges, and first and second opposite sides;

creating a slotted edge in the elongated flat rectangular bar by providing a plurality of spaced apart slots extending from the first edge towards the second edge;

creating a first plurality of scalloped indentations on the first side extending from the slotted edge toward the unslotted edge, each indentation oriented adjacent to one of the plurality of spaced apart slots; and creating a second plurality of scalloped indentations on the second side extending from the slotted edge toward the unslotted edge, each indentation oriented adjacent to one of the plurality of slots and longitudinally offset from the first plurality of scalloped indentations on the first side.

7. The method of making a lattice support high bar according to claim 6, comprising the step of providing an elongated flat rectangular bar which is about 3 inches high.

8. The method of making a lattice support high bar according to claim 6, comprising the step of providing the plurality of scalloped indentations with a maximum depth which is not more than one half of a thickness of the elongated flat rectangular bar.

9. The method of making a lattice support high bar according to claim 6, comprising the step of providing the plurality of scalloped indentations with a length which is greater than one-half a height of the elongated flat rectangular bar.

10. The method of making the lattice support high bar according to claim 6, comprising the step of providing the plurality of scalloped with a length of about 1¾ inches.

* * * * *